United States Patent [19]
Mizuno

[11] Patent Number: 5,786,978
[45] Date of Patent: Jul. 28, 1998

[54] DIELECTRIC CERAMIC COMPOSITION AND CERAMIC CAPACITOR USING THE SAME

[75] Inventor: Youichi Mizuno, Tokyo, Japan

[73] Assignee: Taiyo Yuden Co., Ltd., Tokyo, Japan

[21] Appl. No.: 882,079

[22] Filed: Jun. 25, 1997

[30] Foreign Application Priority Data

Jun. 28, 1996 [JP] Japan ................................. 8-188094

[51] Int. Cl.$^6$ ........................... H01G 4/06; H01G 4/008; C04B 35/46
[52] U.S. Cl. .................. 361/321.5; 361/305; 361/321.1; 501/108; 501/118; 501/122; 501/134; 501/135; 501/136; 501/153; 501/154
[58] Field of Search ....................... 501/108, 118, 501/122, 134–136, 153–154; 361/303–305, 321.1–321.5

[56] References Cited

U.S. PATENT DOCUMENTS 3,468,680  9/1969  Fujiwara .
4,882,652  11/1989  Furukawa et al. .................... 501/136

*Primary Examiner*—Bot L. Ledynh
*Attorney, Agent, or Firm*—Ronald R. Snider

[57] ABSTRACT

The dielectric ceramic composition for use with a laminated capacitor to be used in a high frequency region improves in costs of manufacturing by lowering the temperature of calcination as relatively high as from ca. 1,200° C. to 1,500° C. required for conventional ones and by reducing the expensive costs of electricity required otherwise by the manufacture of conventional ones. The dielectric ceramic composition contains a magnesium silicate-zinc component, an alumina component and a strontium titanate component, as represented by formula:

$$Z(Mg_aZn_{(1-a)})_xSiO_{x+2}-YAl_2O_3-ZSrTiO_3$$

wherein a is equal to or larger than 0.1 and equal to or smaller than 0.8; and x is equal to or larger than 0.67 and equal to or smaller than 1.5; and wherein a molar ratio (%) of the magnesium silicate-zinc component, as represented by $(Mg_aZn_{(1-a)})_xSiO_{x+2}$, to the alumina component, as represented by $Al_2O_3$, to the strontium titanate component, as represented by $SrTiO_3$, is set to be located in an area enclosed by a polygon having the vertexes at points A, B, C and D in a three-component composition diagram indicating molar ratios by percentage (X, Y, Z) of three component compounds; in which the points A, B, C and D are set, respectively, at:

A(94.9, 0.1, 5.0)
B(85.0, 10.0, 5.0)
C(65.0, 10.0, 25.0)
D(65.0, 0.1, 34.9).

The ceramic capacitor with the dielectric ceramic composition disposed as a dielectric layer is provided. The ceramic capacitor is also provided with the internal electrode using palladium or the like.

3 Claims, 1 Drawing Sheet

DIELECTRIC CERAMIC COMPOSITION AND CERAMIC CAPACITOR USING THE SAME

BACKGROUND OF THE INVENTION

1. Field of the Invention

The present invention relates to a dielectric ceramic composition and a ceramic capacitor using the same and, more particularly, to a dielectric ceramic composition suitable for the formation of a dielectric layer of a ceramic capacitor having a low capacitance in the range of from approximately 0.1 pF to 30 pF to be utilized in a high frequency region in the range of from several hundred MHz to several GHz and to a ceramic capacitor using such a dielectric ceramic composition.

2. Description of the Related Art

Hitherto, as a material for a dielectric layer of a ceramic capacitor having a low capacitance, there has been employed a dielectric ceramic composition with a low dielectric constant, which is made of a $TiO_2$ type material, a $CaTiO3$ type material, a $LaTiO_3$ type material, a $CaZrO_3$ type material, a $MgTiO_3$ type material or the like. Further, as a material for an internal electrode of the ceramic capacitor, there has been hitherto been employed platinum (Pt), silver (Ag), palladium (Pd), base metal (Cu, Ni) or the like.

Such materials, however, have some drawbacks for use with the internal electrode of the ceramic capacitor. Platinum (Pt) is so expensive that the resulting internal electrode may also become expensive in its manufacturing cost, and silver (Ag) is likely to migrate into the dielectric layer so that reliability of the resulting ceramic capacitor may be reduced. Further, the base metals such as copper (Cu) and nickel (Ni) suffers from the disadvantage that the atmosphere for calcining them has to be controlled resulting in raising the cost of manufacturing, although they are low in costs as materials in themselves so that in this respect they can reduce the cost of manufacturing the internal electrode.

Palladium (Pd) suffers from the disadvantage that, when it is laminated at a high temperature integrally on a dielectric ceramic composition having a shrinkage start temperature in the range of from approximately 1,200° C. to 1,500° C. much higher than that of the palladium, whose shrinkage start temperature being of approximately 900° C., the palladium may be separated from the dielectric ceramic composition having such a high shrinkage start temperature, although it depends upon its particle size or its surface status. This advantage, however, can be solved by addition of a sintering retarder or the like to the palladium.

Further, such conventional dielectric ceramic compositions have the drawbacks that, as they are calcined at a temperature as high as from 1,200° C. to 1,500° C., a considerably large amount of electricity is required for calcination resulting in a rise of the costs of manufacturing dielectric ceramic compositions.

Such conventional dielectric ceramic compositions also suffer from the disadvantage that they are difficult to apply due to its dielectric constant as relatively large as in the range of from approximately 20 to 200, although it is desired that a dielectric ceramic composition of a multiple layered ceramic capacitor having a capacitance as low as in the range of from approximately 0.1 PF to 30 pF has a low dielectric constant, which is to be employed in a high frequency region in the range of from several hundred MHz to several GHz.

In addition, in cases where palladium is employed as a material for an internal electrode of those conventional dielectric ceramic compositions, it is required that a sintering retarder or the like has to be added in order to prevent a separation of the palladium layer from the dielectric ceramic composition. The addition of the sintering retarder to the palladium, however, may cause the problem that a specific resistance of the internal electrode is elevated to increase ESR, thereby reducing Q-factor in the high frequency region.

SUMMARY OF THE INVENTION

Therefore, the present invention has the object to provide a dielectric ceramic composition having a low dielectric constant of $\epsilon_r$ of 15 or lower, which can be calcined at a temperature of approximately 1,100° C. or lower and which fails to cause a separation of a material for an internal electrode from the dielectric ceramic composition to be laminated, even when pure palladium is employed as the material therefor.

The present invention has another object to provide a ceramic capacitor using such a dielectric ceramic composition as having a low dielectric constant of $\epsilon_r$ of 15 or lower.

In order to achieve the objects, the present invention provides a dielectric ceramic composition comprising a magnesium silicate-zinc component, an alumina component and a strontium titanate component, as represented by formula:

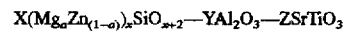

$$X(Mg_aZn_{(1-a)})_xSiO_{x+2}—YAl_2O_3—ZSrTiO_3$$

wherein a is equal to or larger than 0.1 and equal to or smaller than 0.8; and x is equal to or larger than 0.67 and equal to or smaller than 1.5; and wherein a molar ratio (%) of the magnesium silicate-zinc component, as represented by $(Mg_aZn_{(1-a)})_xSiO_{x+2}$, to the alumina component, as represented by $Al_2O_3$, to the strontium titanate component, as represented by $SrTiO_3$, is set to be located in an area enclosed by a polygon having the vertexes at points A, B, C and D in a three-component composition diagram indicating molar ratios by percentage (X, Y, Z) of three component compounds; in which the points A, B, C and D are set, respectively, at:

A(94.9, 0.1, 5.0)

B(85.0, 10.0, 5.0)

C(65.0, 10.0, 25.0)

D(65.0, 0.1, 34.9).

The present invention further provides a ceramic capacitor using the dielectric ceramic composition comprised of the three components at the rates as defined hereinabove.

Other objects, features and advantages of the present invention will become apparent in the course of the description that follows, with reference to the accompanying drawing.

DESCRIPTION OF THE PREFERRED EMBODIMENTS

Figure 1:
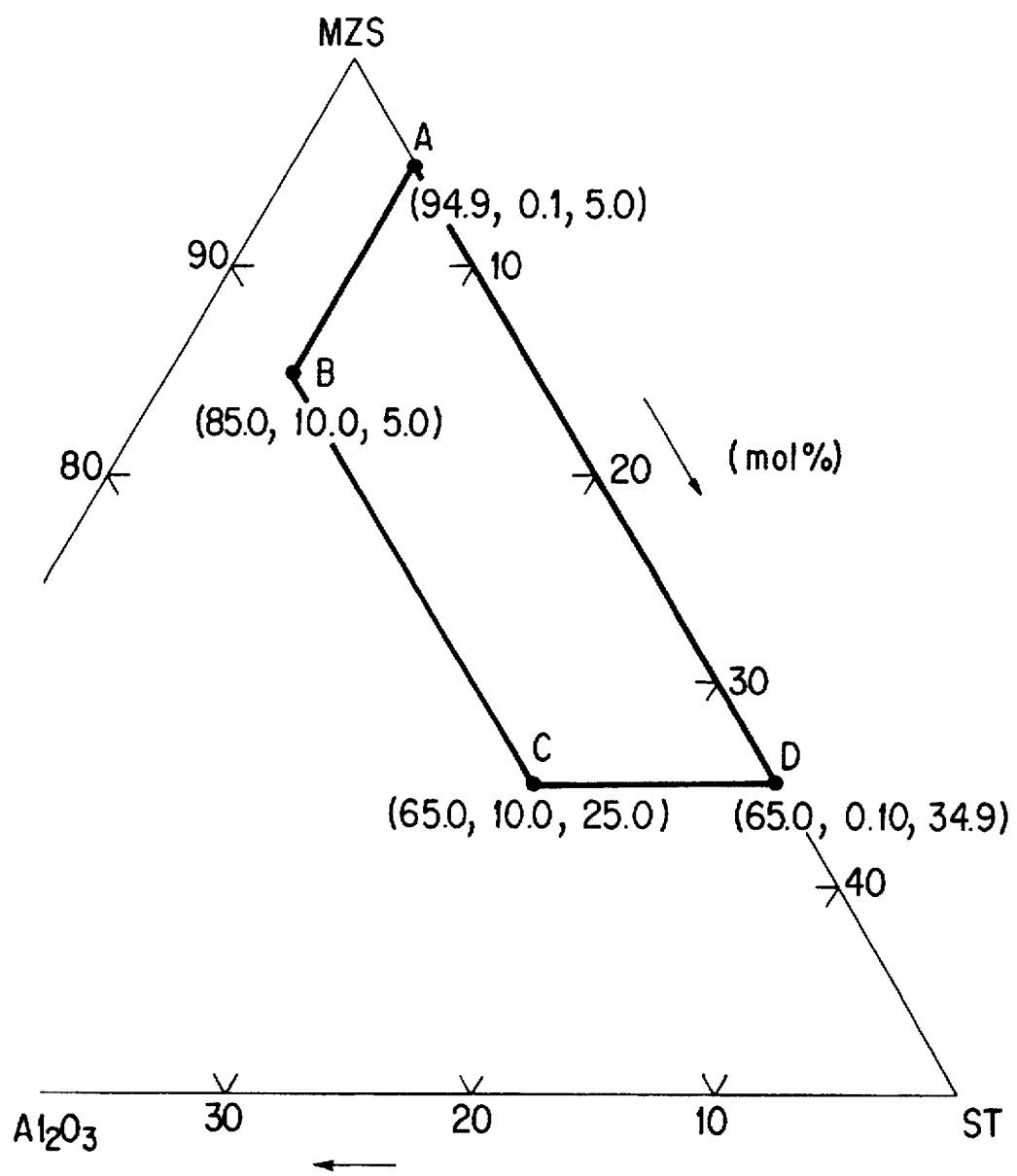
FIG. 1 is a diagram showing the composition of three components.

The dielectric ceramic composition according to the present invention may be represented by formula:

$X(Mg_aZn_{(1-a)})_xSiO_{x+2}$—$YAl_2O_3$—$ZSrTiO_3$.

A molar ratio (%) of the magnesium silicate-zinc component, represented by '$Mg_aZn_{(1-a)})_xSiO_{x+2}$' (hereinafter referred to as "MZS") to the alumina component '$Al_2O_3$' to the strontium titanate '$SrTiO_3$' (hereinafter referred to as "ST") is set to be located in an area enclosed by a polygon having the vertexes at points A, B, C and D in a three-component composition diagram indicating molar ratios by percentage (X, Y, Z) of the three component compounds, in which the points A, B, C and D are set, respectively, at:

A(94.9, 0.1, 5.0)
B(85.0, 10.0, 5.0)
C(65.0, 10.0, 25.0)
D(65.0, 0.1, 34.9)

In the above formula, reference symbols a and x may be set within the range as follows:

$0.1 \leq a \leq 0.8$ $0.67 \leq x \leq 1.5$

The reasons for setting the molar ratio by percentage of the MZS within the range as described hereinabove are because a tightly sintered body cannot be prepared by calcination at a temperature below 1,100° C. if the molar ratio by percentage thereof is outside the set range.

Further, the reasons why the molar ratio by percentage of the alumina component is set within the range as described hereinabove are because, if the molar ratio by percentage thereof is outside the set region, no tightly sintered body can be provided by calcination at a temperature below 1,100° C.

Furthermore, the reasons for setting the molar ratio by percentage of the ST within the range as described hereinabove are because the dielectric constant $\varepsilon_r$ may become larger than 15 or a temperature coefficient may become larger as a minus value, on the one hand, if the molar ratio by percentage thereof is set to be larger than the upper limit of the above range and that no tightly sintered body can be provided by calcination at a temperature below 1,100° C., on the other hand, if the molar ratio by percentage thereof is smaller than the lower limit of the set range.

In instances where the reference symbol a is set to be larger than the upper limit of the above range, there is the risk that no tightly sintered body may be prepared. On the other hand, in instances where the reference symbol a is set to be smaller than the lower limit of the above range, the resulting sintered body may be provided with a great number of pores, thereby making the Q-factor smaller than 1,000.

In addition, in instances where the reference symbol x is set to be larger than the upper limit of the above range, there is the risk that no tightly sintered body may be prepared. On the other hand, in instances where the reference symbol x is set to be smaller than the lower limit of the above range, the resulting sintered body may be welded or formed with a great number of pores, thereby making the Q-factor smaller than 1,000.

For the ceramic capacitor according to the present invention, there is employed the dielectric ceramic composition according to the present invention as a dielectric layer. For the material of the internal electrode therefor, palladium may be employed, although silver (Ag) and platinum (Pt) may also be employed. Further, the ceramic capacitor according to the present invention may be of a mono layered type or of a multiple layered type. More specifically, the ceramic capacitor may be constructed in such a manner that the dielectric layers and the internal electrodes are superimposed alternately on one another.

Further, although the ceramic capacitor according to the present invention may be sufficiently employed in a low frequency region, it is preferably employed as a ceramic capacitor having a low capacitance in the range of from approximately 0.1 pF to 30 pF, to be employed in a high frequency region in the range of from several hundred MHz to several GHz.

EXAMPLES

The present invention will be described in more detail by way of examples with reference to the accompanying drawing.

1. Preparation of the magnesium silicate-zinc component:

Three component compounds, MgO, ZnO and $SiO_2$, were weighed at the rates as shown in Table 1 attached hereto, and placed them together into a ball mill. The resulting mixture of them was wet-milled and mixed for 15 hours into a slurry and the resulting slurry was filtered to yield a cake portion which in turn was placed in a dryer. The cake portion was dried at 150° C. yielding powder of the mixture containing the three component compounds.

TABLE 1 ①

| | | I | | | | II | | |
|---|---|---|---|---|---|---|---|---|
| | | MZS | a | x | Firing Temp. | $Al_2O_3$ | ST | Firing Temp. |
| 1 | x | 94.5 | 0.8 | 1.0 | 1100 | 5.5 | 0 | — |
| 2 | o | 89.5 | 0.8 | 1.0 | 1100 | 5.0 | 5.5 | — |
| 3 | o | 94.9 | 0.2 | 1.0 | 1100 | 0.1 | 5.0 | — |
| 4 | x | 85.0 | 0.2 | 1.0 | 1100 | 11.7 | 3.3 | — |
| 5 | o | 85.0 | 0.2 | 1.0 | 1100 | 10.0 | 5.0 | — |
| 6 | o | 85.0 | 0.2 | 1.0 | 1100 | 9.6 | 5.4 | — |
| 7 | o | 86.4 | 0.2 | 1.0 | 1100 | 3.0 | 10.6 | — |
| 8 | o | 84.9 | 0.2 | 1.0 | 1100 | 4.8 | 10.3 | — |
| 9 | o | 83.8 | 0.2 | 1.0 | 1100 | 6.0 | 10.2 | — |
| 10 | o | 79.8 | 0.2 | 1.0 | 1100 | 10.0 | 10.2 | — |
| 11 | o | 81.5 | 0.2 | 1.0 | 1000 | 5.8 | 12.7 | 800 |
| 12 | o | 81.5 | 0.2 | 1.0 | 1100 | 5.8 | 12.7 | 800 |
| 13 | o | 81.5 | 0.2 | 1.0 | 1200 | 5.8 | 12.7 | 800 |
| 14 | o | 72.5 | 0.2 | 1.0 | 1000 | 5.2 | 22.3 | 850 |
| 15 | o | 72.5 | 0.2 | 1.0 | 1100 | 5.2 | 22.3 | 850 |
| 16 | o | 72.5 | 0.2 | 1.0 | 1200 | 5.2 | 22.3 | 850 |
| 17 | o | 74.5 | 0.2 | 1.0 | 1100 | 2.6 | 22.9 | — |
| 18 | o | 70.9 | 0.2 | 1.0 | 1100 | 7.4 | 21.7 | — |
| 19 | x | 67.2 | 0.2 | 1.0 | 1100 | 12.2 | 20.6 | — |
| 20 | x | 84.5 | 1.0 | 1.0 | 1100 | 5.0 | 10.5 | — |
| 21 | x | 84.5 | 0.9 | 1.0 | 1100 | 5.0 | 10.5 | — |
| 22 | o | 84.5 | 0.8 | 1.0 | 1100 | 5.0 | 10.5 | — |
| 23 | o | 79.5 | 0.8 | 1.0 | 1100 | 5.0 | 15.5 | — |
| 24 | o | 78.7 | 0.7 | 1.0 | 1100 | 4.8 | 16.5 | — |
| 25 | o | 77.6 | 0.5 | 1.0 | 1100 | 5.0 | 17.4 | — |
| 26 | o | 75.9 | 0.2 | 1.0 | 1100 | 5.4 | 18.7 | — |
| 27 | o | 74.5 | 0.1 | 1.0 | 1100 | 6.0 | 19.5 | — |
| 28 | x | 73.0 | 0 | 1.0 | 1100 | 6.5 | 20.5 | — |
| 29 | o | 74.4 | 0.2 | 1.33 | 1070 | 0.1 | 25.5 | — |
| 30 | o | 87.6 | 0.2 | 1.33 | 1070 | 0.1 | 12.3 | — |
| 31 | o | 82.5 | 0.2 | 1.33 | 1070 | 1.0 | 16.5 | — |
| 32 | x | 76.0 | 0.2 | 1.33 | 1070 | 0 | 23.0 | — |
| 33 | o | 70.9 | 0.2 | 1.33 | 1070 | 0.6 | 28.5 | — |
| 34 | o | 70.8 | 0.2 | 1.33 | 1070 | 1.2 | 28.0 | — |
| 35 | o | 69.5 | 0.2 | 1.33 | 1070 | 2.5 | 28.0 | — |

TABLE 1 ②

| | | I | | | | II | | |
|---|---|---|---|---|---|---|---|---|
| | | MZS | a | x | Firing Temp. | $Al_2O_3$ | ST | Firing Temp. |
| 36 | o | 65.0 | 0.2 | 1.33 | 1070 | 10.0 | 25.0 | — |
| 37 | o | 65.0 | 0.2 | 1.33 | 1070 | 2.0 | 33.0 | — |
| 38 | o | 65.0 | 0.2 | 1.33 | 1070 | 0.1 | 34.9 | — |
| 39 | x | 60.0 | 0.2 | 1.33 | 1070 | 10.0 | 30.0 | — |
| 40 | x | 60.0 | 0.2 | 1.33 | 1070 | 2.0 | 38.0 | — |

TABLE 1 ②-continued

| | | I | | | | II | |
|---|---|---|---|---|---|---|---|
| | MZS | a | x | Firing Temp. | Al₂O₃ | ST | Firing Temp. |
| 41 | x | 60.0 | 0.2 | 1.33 | 1070 | 0.1 | 39.9 | — |
| 42 | o | 83.8 | 0.2 | 1.0 | 1070 | 6.0 | 10.2 | — |
| 43 | o | 82.3 | 0.2 | 1.2 | 1070 | 6.6 | 11.1 | — |
| 44 | o | 80.2 | 0.2 | 1.5 | 1070 | 7.3 | 12.5 | — |
| 45 | x | 77.0 | 0.2 | 2.0 | 1070 | 8.5 | 14.5 | — |
| 46 | o | 75.1 | 0.2 | 0.67 | 1070 | 8.5 | 16.4 | — |
| 47 | x | 76.7 | 0.2 | 0.5 | 1070 | 8.5 | 14.8 | — |
| 48 | o | 89.9 | 0.2 | 1.33 | — | 1.3 | 8.8 | — |
| 49 | o | 83.3 | 0.2 | 1.33 | — | 1.3 | 15.4 | — |
| 50 | o | 75.5 | 0.2 | 1.33 | — | 1.3 | 23.2 | — |
| 51 | o | 66.9 | 0.2 | 1.33 | — | 2.5 | 30.6 | — |
| 52 | o | 67.8 | 0.2 | 1.33 | — | 1.2 | 31.0 | — |

The powder was then placed into an oven and it was calcinated at 900° C. to 1,200° C. to react the three component compounds with one another, yielding the magnesium silicate zinc component.

The resulting magnesium silicate-zinc component was then milled in a wet manner and pulverized well to yield a slurry of the magnesium silicate-zinc component. The slurry was filtered and the resulting cake was dried well at 150° C. yielding powder of the magnesium silicate-zinc component.

2. Preparation of the dielectric ceramic composition:

The magnesium silicate-zinc component prepared above, the alumina component and the strontium titanate component were weighed at the rates in accordance with Table 1 above and they were placed in a ball mill. They were wet-milled well yielding a slurry which in turn was filtered.

The resulting cake portion was placed in a dryer and dried at 150° C. yielding powder of the three component compounds.

The resulting powder was then placed in an oven and calcinated at 700° C. to 900° C. for two to four hours. Thereafter, an organic binder was added and the resulting mixture was granulated. The granules were pressed to a sample in the form of a disk-shaped plate having a diameter of approximately 10 mm and a thickness of approximately 0.5 mm.

The sample was calcined at 950° C. to 1,100° C. for one to four hours yielding a sintered body which in turn was coated with a silver (Ag) paste. The sintered body coated was then calcined at 700° C. for 15 minutes to yield an outer electrode, thereby resulting in the formation into a ceramic capacitor.

The resulting ceramic capacitor was measured for the capacitance, Q factor, the temperature coefficient of dielectric constant (i.e. a rate of changes at 85° C. based on the reference at 20° C.), and the insulation resistance at 150° C. (as an average of ten sheets of each sample) at HP4284A, 1 MHz and 1 Vrms.

The results are shown in Table 2 attached hereto. In the Table 2, the TCC was measured by the following formula:

$$TCC\ [ppm/°C.] = \frac{C_{85} - C_{20}}{C_{20} \times 65} \times 10^6$$

TABLE 2 ①

| No. | | Firing Temp.[°C.] | εr | Q | ρ [MΩcm] | TCC [ppm/°C.] | character (JIS) | remarks |
|---|---|---|---|---|---|---|---|---|
| 1 | x | 1100 | | | | | | No tightly sintered body formed |
| 2 | o | 1100 | 7.5 | 2858 | 2.1E7 | +72.4 | CJ | |
| 3 | o | 1100 | 7.1 | 2416 | 2.0E7 | +92.4 | CJ | |
| 4 | x | 1100 | | | | | | No tightly sintered body formed |
| 5 | o | 1100 | 7.8 | 4151 | 2.1E7 | +8.0 | CH | |
| 6 | o | 1100 | 8.2 | 5872 | 3.0E7 | −15.4 | CH | |
| 7 | o | 1050 | 8.0 | 8995 | 2.5E6 | −22.1 | CH | |
| 8 | o | 1100 | 8.4 | 7614 | 3.4E6 | −51.2 | CH | |
| 9 | o | 1100 | 6.1 | 9753 | 2.2E6 | −38.1 | CH | |
| 10 | o | 1100 | 8.9 | 8586 | 3.9E6 | −63.2 | CJ | |
| 11 | o | 1035 | 8.0 | 9857 | 1.4E6 | −9.5 | CH | |
| 12 | o | 1035 | 8.3 | 9258 | 4.9E6 | −11.9 | CH | |
| 13 | o | 1035 | 7.7 | 9421 | 8.1E6 | +3.8 | CH | |
| 14 | o | 1025 | 11.0 | 8734 | 7.3E6 | −173.0 | RH | |
| 15 | o | 1035 | 13.1 | 8311 | 7.3E6 | −378.6 | SH | |
| 16 | o | 1025 | 11.5 | 1120 | 3.9E7 | −216.0 | RH | |
| 17 | o | 1000 | 12.6 | 7510 | 1.2E6 | −279.0 | RH | |
| 18 | o | 1035 | 12.0 | 3168 | 2.0E6 | −258.1 | RH | |
| 19 | x | 1100 | | | | | | No tightly sintered body formed |
| 20 | x | 1100 | 8.3 | 4569 | 1.5E7 | +26.7 | CH | |
| 21 | x | 1100 | | | | | | No tightly sintered body formed |
| 22 | o | 1100 | 8.5 | 3718 | 2.1E7 | +39.2 | CH | |
| 23 | o | 1100 | 10.6 | 4021 | 2.2E7 | −66.8 | CJ | |
| 24 | o | 1100 | 9.6 | 2530 | 2.2E7 | −6.3 | CH | |
| 25 | o | 1050 | 9.5 | 2655 | 1.6E7 | −50.1 | CH | |
| 26 | o | 1050 | 10.7 | 1802 | 1.7E7 | −152.7 | PH | |
| 27 | o | 1050 | 10.8 | 1748 | 1.7E7 | −184.9 | RH | |
| 28 | x | 1050 | 7.0 | 866 | 3.6E6 | −238.9 | RH | |
| 29 | o | 1030 | 11.5 | 7485 | 2.0E7 | −81.5 | CJ | |
| 30 | o | 1030 | 8.1 | 3634 | 1.0E7 | +20.0 | CH | |
| 31 | o | 975 | 14.0 | 8950 | 3.5E7 | −220.0 | RH | |
| 32 | x | 1100 | | | | | | No tightly sintered body formed |
| 33 | o | 1060 | 12.8 | 6457 | 1.8E7 | −182.0 | RH | |
| 34 | o | 1060 | 13.3 | 6554 | 1.5E7 | −232.0 | RH | |

TABLE 2 ①-continued

| No. | | Firing Temp.[°C.] | εr | Q | ρ [MΩcm] | TCC [ppm/°C.] | character (JIS) | remarks |
|---|---|---|---|---|---|---|---|---|
| 35 | o | 1030 | 12.3 | 9785 | 1.5E7 | −145.0 | PH | |

TABLE 2 ②

| No. | | Firing Temp.[°C.] | εr | Q | ρ [MΩcm] | TCC [ppm/°C.] | character (JIS) | remarks |
|---|---|---|---|---|---|---|---|---|
| 36 | o | 1100 | 13.8 | 9568 | 2.8E7 | −295.3 | SH | |
| 37 | o | 1100 | 14.1 | 7214 | 1.2E7 | −352.3 | SH | |
| 38 | o | 1050 | 14.8 | 6925 | 8.2E6 | −381.5 | SH | |
| 39 | x | 1100 | | | | | | No tightly sintered body formed |
| 40 | x | 1100 | | | | | | No tightly sintered body formed |
| 41 | o | 1100 | 21.5 | 3859 | 7.2E6 | −475.1 | | |
| 42 | o | 1075 | 8.0 | 8190 | 1.9E6 | −11.4 | CH | |
| 43 | o | 1075 | 8.1 | 8331 | 1.5E7 | −236 | CH | |
| 44 | o | 1075 | 7.9 | 9508 | 1.6E7 | +34.8 | CH | |
| 45 | x | 1100 | | | | | | No tightly sintered body formed |
| 46 | o | 1075 | 7.4 | 3521 | 1.8E7 | +53.3 | CH | |
| 47 | x | 1075 | 6.9 | 739 | 2.1E7 | +26.0 | CH | |
| 48 | o | 1050 | 7.2 | 5794 | 9.8E6 | +73.3 | CJ | |
| 49 | o | 1050 | 8.7 | 5442 | 7.3E6 | −26.3 | CH | |
| 50 | o | 1050 | 9.9 | 8743 | 4.1E7 | −94.2 | PH | |
| 51 | o | 1050 | 12.1 | 7859 | 9.2E6 | −215.0 | RH | |
| 52 | o | 1035 | 11.4 | 7547 | 3.5E7 | −174.0 | RH | |

From the results of Table 2, it is found that, as indicated by Samples Nos. 39 and 40, no tightly sintered body was prepared upon calcination at 1,100° C. or lower, when the molar ratio of the magnesium silicate-zinc component was 65.0 molar ratio by percentage or less.

It is further found, on the one hand, that, as indicated by Samples Nos. 4 and 19, no tightly sintered body was formed upon calcination at 1,100° C. or lower, if the molar ratio of the $Al_2O_3$ component was 10.0 molar ratio by percentage or more and, on the other hand, that, as indicated by Sample No.32, no tightly sintered body was provided upon calcination at 1,100° C. or lower, when the molar ratio of the $Al_2O_3$ component was 0.1 molar ratio by percentage or less.

From the results of Table 2, it is also found, on the one hand, that, as indicated by Sample No. 41, the dielectric constant may become too high or the temperature coefficient may become too large as a minus value, when the molar ratio of the strontium titanate component was 34.9 molar ratio by percentage or more and, on the other hand, as indicated by Samples Nos. 1 and 4, no tightly sintered body was provided upon calcination at 1,100° C., when the molar ratio of the strontium titanate component was 5.0 molar ratio by percentage or less.

Further, the results of Table 2 shows that when the reference symbol a is larger than 0.8, on the one hand, no tightly sintered body is formed upon calcination at 1,100° C., as indicated by Sample No. 20, and that when the reference symbol a is less than 0.1, on the other hand, a large number of pores are formed within the resultant sintered body and the Q factor may become less than 1,000, as indicated by Sample No. 28.

It is also found from the results of Table 2 that when the reference symbol x is larger than 1.5, on the one hand, no tightly sintered body is formed upon calcination at 1,100° C., as indicated by Sample No. 45, and that when the reference symbol a is less than 0.67, on the other hand, the resulting compositions may become more likely to be welded to each other, the clearance of the temperature appropriate for calcination may become very narrow, a large number of pores may be formed within the sintered body and the Q factor may become less than 1,000, as indicated by Sample No. 47.

It is now noted herein that no changes in the desired characteristics may be caused even whether the mixture of the three components consisting of the magnesium silicate-zinc component, the alumina component and the strontium titanate component is calcinated or not. It should be noted, however, that the calcination of the mixture causes changes in the electrical characteristics. The calcination may cause a reaction of the main components with the additives or the additives with one another and change a crystalline system so that it is effective for cases where a rapid shrinkage may be caused or where a rate of shrinkage may become large. In other words, the calcination is effective for controlling the structural defects, such as separation of layers, cracking, etc.

Furthermore, it is found that the dielectric ceramic composition according to the present invention can be sintered at the calcination temperature of 1,100° C. or lower, the dielectric constant is as low as equal to 15 or less, the Q factor is high, e.g. 1,000 or higher at 1 MHz, the resistivity at 150° C. is high, e.g. $1.0 \times 10^3$M Ωcm or higher, the temperature coefficient of the capacitance is small, and the JIS (Japanese Industrial Standards) specification as follows is met:

CH characteristic=−60−+60 [ppm/°C.]
CJ characteristic=−120−+120 [ppm/°C.]
PH characteristic=−90—210 [ppm/°C.]
RH characteristic=−160—280 [ppm/°C.]
SH characteristic=−270—390 [ppm/°C.]

EFFECTS OF THE INVENTION

The present invention provides the effect to provide a multiple layered ceramic capacitor having a low capacitance low in loss, in the range of from approximately 0.1 pF to 30 pF, which has the high Q factor in the high frequency region in the range of several hundred MHz to several GHz and which is less in loss.

The present invention further provides the effect that the structural defects such as delamination, etc. can be prevented and the costs of manufacturing the ceramic capacitors can be reduced due to the reduced costs of electricity upon calcination, because the temperature for sintering the dielectric ceramic composition can be reduced to 1,100° C. or lower.

Furthermore, the present invention can offer the effect that pure palladium (Pd) can be used as a material for an internal electrode, thereby forming a ceramic capacitor having high reliability.

What is claimed is:

1. A dielectric ceramic composition comprising a magnesium silicate-zinc component, an alumina component and a strontium titanate component, as represented by formula:

$$X(Mg_aZn_{(1-a)})_xSiO_{x+2}—YAl_2O_3—ZSrTiO_3$$

wherein a is equal to or larger than 0.1 and equal to or smaller than 0.8; and x is equal to or larger than 0.67 and equal to or smaller than 1.5; and wherein a molar ratio (%) of the magnesium silicate-zinc component, as represented by $(Mg_aZn_{(1-a)})_xSiO_{x+2}$, to the alumina component, as represented by $Al_2O_3$, to the strontium titanate component, as represented by $SrTiO_3$, is set to be located in an area enclosed by a polygon having the vertexes at points A, B, C and D in a three-component composition diagram indicating molar ratios by percentage (X, Y, Z) of three component compounds; in which the points A, B, C and D are set, respectively, at:

A(94.9, 0.1, 5.0)
B(85.0, 10.0, 5.0)
C(65.0, 10.0, 25.0)
D(65.0, 0.1, 34.9).

2. A ceramic capacitor having a dielectric ceramic composition comprising a magnesium silicate-zinc component, an alumina component and a strontium titanate component, as represented by formula:

$$X(Mg_aZn_{(1-a)})_xSiO_{x+2}—YAl_2O_3—ZSrTiO_3$$

wherein a is equal to or larger than 0.1 and equal to or smaller than 0.8; and x is equal to or larger than 0.67 and equal to or smaller than 1.5; and wherein a molar ratio (%) of the magnesium silicate-zinc component, as represented by $(Mg_aZn_{(1-a)})_xSiO_{x+2}$, to the alumina component, as represented by $Al_2O_3$, to the strontium titanate component, as represented by $SrTiO_3$, is set to be located in an area enclosed by a polygon having the vertexes at points A, B, C and D in a three-component composition diagram indicating molar ratios by percentage (X, Y, Z) of three component compounds; in which the points A, B, C and D are set, respectively, at:

A(94.9, 0.1, 5.0)
B(85.0, 10.0, 5.0)
C(65.0, 10.0, 25.0)
D(65.0, 0.1, 34.9).

3. A ceramic capacitor as claimed in claim 2, wherein pure palladium (Pd) is employed as a material for an internal electrode of said ceramic capacitor.

* * * * *